Figure 1:
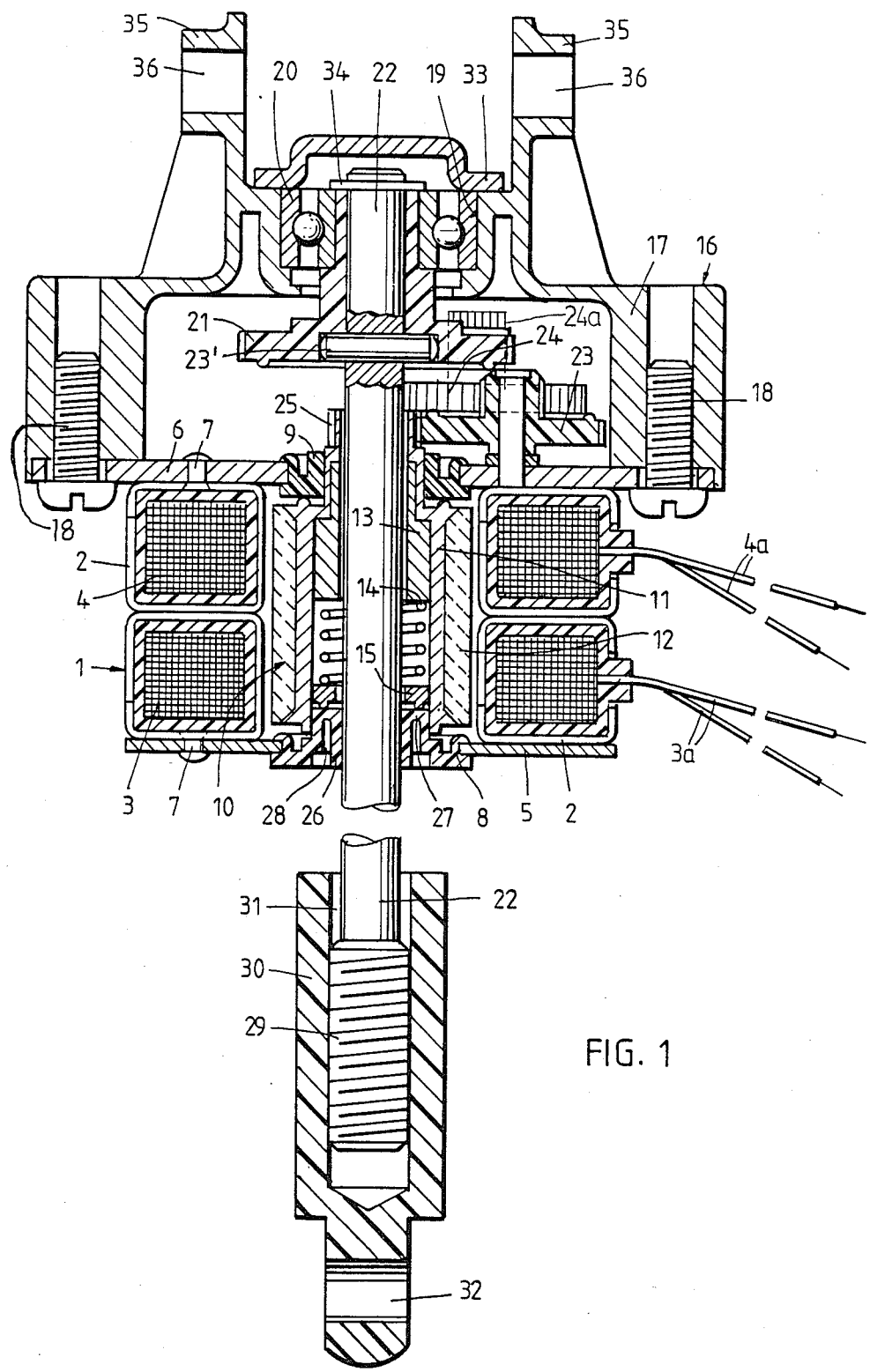

United States Patent [19]

Pfister

[11] Patent Number: 4,553,056
[45] Date of Patent: Nov. 12, 1985

[54] CONFIGURATION AND BEARING FOR A MOTOR-DRIVEN LINEAR ACTUATOR

[75] Inventor: Jean-François Pfister, Sonceboz, Switzerland

[73] Assignee: Societe Industrielle de Sonceboz S.A., Sonceboz, Switzerland

[21] Appl. No.: 592,129

[22] Filed: Mar. 22, 1984

[30] Foreign Application Priority Data

Mar. 30, 1983 [CH] Switzerland .......................... 1777/83

[51] Int. Cl.[4] .............................................. H02K 7/06
[52] U.S. Cl. ...................................... 310/80; 74/89.15;
 310/43; 310/90; 310/105; 384/125
[58] Field of Search .......................... 74/89.15, 421 A;
 310/80, 83, 90, 98, 103, 156, 162, 266, 12, 82,
 105, 43; 384/125, 202; 376/228, 234

[56] References Cited

U.S. PATENT DOCUMENTS

| | | | |
|---|---|---|---|
| 3,028,513 | 4/1962 | Sundt ...................................... | 310/83 |
| 3,467,449 | 9/1969 | Muijderman ......................... | 384/125 |
| 3,790,237 | 2/1974 | Quaile et al. ......................... | 384/125 |
| 4,090,746 | 5/1978 | Harkins et al. ....................... | 384/125 |
| 4,137,473 | 1/1979 | Pfister .................................... | 310/98 |
| 4,333,026 | 6/1982 | Bock et al. . | |

FOREIGN PATENT DOCUMENTS

| | | |
|---|---|---|
| 230087 | 8/1960 | Australia ............................... 310/83 |
| 501163 | 2/1951 | Belgium . |
| 1019524 | 1/1953 | France . |
| 627004 | 7/1949 | United Kingdom . |
| 1142634 | 2/1969 | United Kingdom . |

OTHER PUBLICATIONS

Product Engineering, May 1971, p. 19.

*Primary Examiner*—Peter S. Wong
*Assistant Examiner*—D. L. Rebsch
*Attorney, Agent, or Firm*—Pollock, Vande Sande and Priddy

[57] ABSTRACT

A simple, inexpensive, and effective linear actuator design comprises a motor adjacent to a speed-reducer, with the driven stem of the speed-reducer passing through the rotor of the motor. The stem has one bearing at one end of the reducer and its second bearing at the end of the motor, in a bearing part likewise serving as a bearing for the rotor. The distance between the two bearings is increased, and the second bearing includes a socket which has a radial elasticity owing to the fact that it is monolithically joined to the fixed bearing part via a thin portion. This second bearing part is advantageously of synthetic material. The rotation of the stem actuates a driven linear-motion part, which is prevented from rotating and which executes a translatory movement.

12 Claims, 2 Drawing Figures

CONFIGURATION AND BEARING FOR A MOTOR-DRIVEN LINEAR ACTUATOR

This invention relates to actuating mechanisms, and more particularly to a linear actuator of the type comprising an electric motor having a rotor and a driven rotary assembly coaxial with the rotor, a speed-reducer having a driving wheel integral with the driven rotary assembly of the motor, as well as a reducer driven wheel, and a rotary actuating rod or stem rotating with the driven wheel of the speed-reducer and comprising, on a portion outside the motor and the speed-reducer as a whole, a thread on which a corresponding thread of a driven linear-motion part cooperating with the mentioned rod or stem is fitted, or is intended to fit, this driven linear-motion part being prevented from rotating, and moving linearly in the same direction as the axis of the rod or stem when the latter rotates.

Linear actuators of the aforementioned type, or at least in the same category, have already been proposed, but the prior art actuators present certain drawbacks. First of all, they are generally relatively expensive, the motor and the reducer being made up of numerous parts with several bearing arrangements, at least some of which must satisfy rather strict requirements. It is, in fact, expensive to manufacture and suitably dispose the bearings, in principle four in number, for the rotor of the motor and for the rod rotating with the driven wheel of the reducer. The bearing mounting of this rod itself poses problems to which there has not been any really satisfactory solution until now, owing to the fact that the operative portion of this rod, i.e., the threaded part, is cantilevered and is subjected, by the component which it moves linearly by means of the driven linear-motion part, to radial pressure effects which tend to alter its position in the bearings. This drawback is all the more delicate as the two bearings which can guide this rod are relatively close to one another, separated only by a distance corresponding to the height of the speed-reducer. Devices have also been proposed in which the rotor of a motor is hollow, and a part rotating at a different speed from the rotor passes through it. In a general case, it might appear simple to envisage, at one end of the motor, a combined arrangement of bearings for the above-mentioned rotor and rotary part.

In the case of an actuator device of the type initially defined, on the other hand, the provision of a rod passing through the rotor could not be envisaged without resolving particular difficulties having to do with the very nature of the actuator. These difficulties relate to the substantial risk, mentioned above, of lateral pressure applied to the operative end of the rod and tending to push it sideways within the closest bearing surface. Possible increased friction between the rod and the rotor would not affect the rotation of the rod itself provided that the reducer is alway capable of driving it, in view of the high driving torque resulting from the great reduction in speed; but this would not apply to the rotor, which is capable of furnishing only a rather weak torque, and which would easily become blocked if lateral friction should occur because of axial pressure exerted toward the end of the rod. It is not possible to extend conventionally the distance between the two bearings which guide the rod by moving one of these bearings away from the space defined by the housing of the speed-reducer, i.e., on the other side of the motor which adjoins the speed-reducer, and such a construction in any case runs up against the problem mentioned previously, which is specific to the case of a linear actuator of the type in question.

Another disadvantageous factor in the prior art is the number and expensive manufacture of the parts going to make up the actuator as a whole, whereas it would be highly desirable to have an actuator of adequate and advantageous design, one that is reliable but can be marketed at a low price. Until now, there have been no such actuators produced.

It is therefore an object of this invention to provide an improved linear actuator, powered by an electric motor, which is more advantageous than those proposed in the prior art, especially from the points of view mentioned above.

To this end, in the linear actuator according to the present invention, of the type initially defined, the speed-reducer has its driving wheel and its driven wheel coaxial with one another and is placed coaxially adjacent to the motor, the common axis of its driving and driven wheels being in alignment with the axis of the driven rotary assembly and the rotor of the motor, the rod passing axially through the rotor and the driven rotary assembly of the motor, and having its threaded portion on the side of the motor opposite that where the reducer is situated, this rod having a first bearing at the end of the reducer opposite the motor and a second bearing at the location of the end of the motor opposite the reducer, this second bearing being provided by a bearing part fixed to the corresponding end of the motor and likewise furnishing a radially fixed bearing for the rotor and/or the driven rotary assembly of the motor, this bearing piece having, as a bearing for the rod, a socket portion capable of moving resiliently radially relative to the rest of the body of this bearing part forming the radially fixed bearing.

The electric motor is advantageously of the stepping type and comprises a rotor which is an integral part of a pinion constituting the driving element of the speed-reducer.

However, the same arrangement may be applied in the case where the motor is of a type known per se, e.g., from applicant's U.S. Pat. No. 4,137,473, in which a hysteresis coupling is mounted coaxially within the rotor, so that one and the same annular part constitutes both the rotor of the motor and the driving part of the hysteresis coupling.

In any event, the bearing part which, in the proposed design, furnishes at the same time a radially fixed bearing for the rotor and/or the driven rotary assembly of the motor, and a radially resilient bearing for the rotary rod of the actuator is advantageously made of plastic material, and its socket-shaped portion is monolithically connected to the rest of its body in such a way as to allow a slight resilient radial displacement of the socket, owing to the fact that the plastic material, when in thin portions, can be considered as a resilient material (whereas in thick portions, it may rather be considered a relatively rigid material).

In order to reduce the number and cost of the components as much as possible, the housing of the speed-reducer is advantageously formed by an interposed plate, on the one hand, this part serving both as an end plate of the motor and as the end plate of the reducer housing, and on the other hand, of a bell-shaped part made of cast or molded material, typically of foundable cast aluminum (or else of high-solidity synthetic material). The interposed plate, or also the bell-shaped cast part, thus has the fittings required for forming the bearings of the intermediate wheel or wheels of the reducer; and the bell-shaped cast or molded part advantageously comprises a cylindrical bearing surface which preferably supports a ball-bearing or similar type of bearing, or which could equally well itself form, or could bear, a smooth bearing.

The embodiments of the invention defined and claimed herein are particularly advantageous from the points of view previously mentioned as well as in other respects relating to reliability, simplicity, advantageous cost, ease of use, etc.

Figure 2:
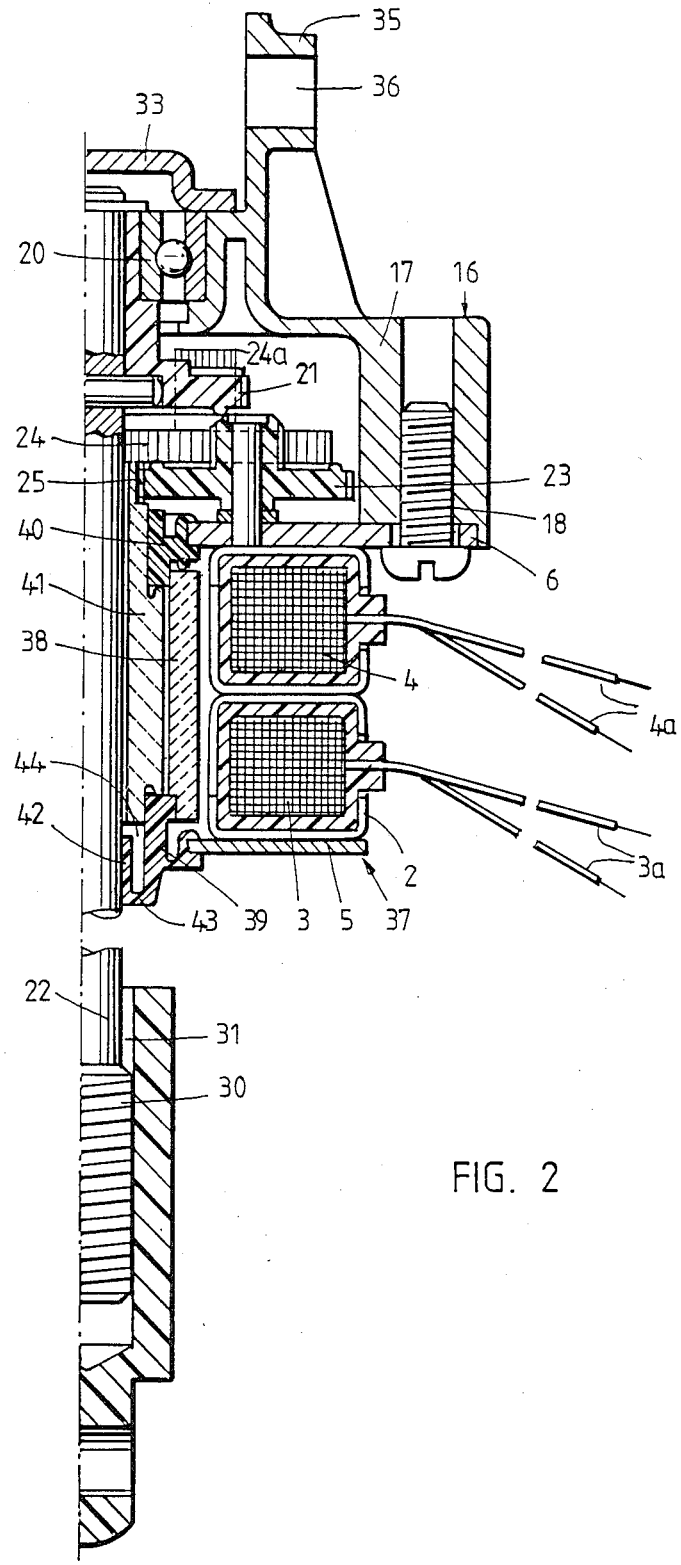

Two preferred embodiments of the invention will now be described in detail with reference to the accompanying drawings, in which:

FIG. 1 is a sectional view of an actuator of the particular type proposed, comprising a stepping motor, the driven rotary assembly of which is integral with the rotor, and FIG. 2 is a view partially in section, similar to a portion of FIG. 1, and illustrating another embodiment of an actuator according to the proposed concept, comprising a rotary assembly driven by the rotor via a hysteresis coupling.

The linear actuator shown in FIG. 1 comprises a motor 1, which is a conventional stepping motor having a magnetic stator circuit 2, of a known type with overlapping poles, two coils 3 and 4 being mounted in stator 2. Through the use of a two-coil stepping motor, the latter can easily be controlled forward and backward. Other known arrangements might naturally be used, some having a single coil, to produce a stepping motor operating forward and backward according to the electric command it receives. The electric pulses intended to cause motor 1 to operate forward or backward, according to the relative phase of its electric pulses, are supplied to coils 3 and 4 by wires 3a and 4a, respectively.

Motor 1 comprises an annular end plate 5 which may be quite simply fixed by riveting, or by other means such as soldering, cementing, etc., against the end portion of stator 2. On the other side of motor 1 there is an interposed annular plate 6, likewise fixed by riveting or other means to the other end of stator 2. Riveting locations are indicated by reference numerals 7 by way of example. Plates 5 and 6 centrally bear bearing parts 8 and 9, respectively. A rotor 10 is mounted with the aid of bearings 8 and 9. In this embodiment, rotor 10 is formed by a cylindrical support part 11 onto which a ferrite part 12 having permanent magnetic poles is driven, then fixed in a suitable manner, e.g., by jagging support part 11 at one end. In the embodiment shown in FIG. 1, there is also an annular part 13 held by a spring 14 against a ring 15 within rotor support part 11, in order to ensure a resilient pressure against bearing parts 8 and 9 so as always to have rotor 10 exactly positioned axially. However, this particular arrangement of rotor 10 is not essential to the proposed device. A motor of a quite different type might even be used, say, an electric motor other than a stepping motor.

Interposed plate 6 simultaneously constitutes the base plate of a speed-reducer generally designated by reference numeral 16. Speed-reducer 16 is mounted in a housing formed by interposed annular plate 6 and a bell-shaped body 17 of cast or molded material, the periphery of which is screwed to that of interposed plate 6 by screws 18. Any other kind of fastening (cotter-pins, bayonet, hooks, etc.) might naturally be used instead.

Bell-shaped body 17 includes centrally a cylindrical surface 19 within which a ball-bearing 20 is accommodated. The latter might be replaced by a smooth bearing, for instance; or else, depending on the material of which part 19 is made, the smooth bearing might consist directly of an inner cylindrical surface bored out of that part. A driven gear 21, in the form of a toothed wheel with an extended hub, is fixed on a stem or rod 22, e.g., by means of a cotter 23', and this driven gear wheel 21 fixed on rod 22 is mounted in bearing 20. Two intermediate reducing gear-wheels 23 and 24 convert the rotary motion of the driven wheel of motor 1, which is at the same time the driving wheel of speed-reducer 16, and which takes the form of a pinion gear 25 at the end of support part 11 of the rotor. Intermediate gears 23 and 24 are held in suitable bearings formed in interposed plate 6; the bearings might be provided instead in bell-shaped body 17. Gear 24 has two parts which are integral with one another, one of said parts meshing with gear 23, and the other of said parts, i.e., part 24a, being in mesh engagement with gear 21.

An important feature of the reducer described above is that rod 22, actuated by gear 21 constituting the driven wheel of speed-reducer 16, passes axially through rotor 10 of motor 1 and has its second bearing in bearing part 8. Rod 22, with gear 21, is thus guided by two bearings which are relatively far from one another, which greatly improves the guidance of rod 22. It will be noted that bearing part 9 of synthetic material, mounted in interposed plate 6, is not in contact with rod 22, which has ball-bearing (or the like) 20 as its bearing, as well as a socket portion 26 of bearing part 8. Socket portion 26 is joined to the body of bearing part 8 by a thin radial portion 27 (thinner than indicated in the drawing) having a certain elasticity, it being the nature of synthetic material to be resilient when thin enough. Socket portion 26 is therefore capable of moving laterally resiliently if the end of rod 22 is subject to lateral pressure. However, this lateral pressure, the response to which is a slight resilient movement of socket portion 26, is not transmitted to the rest of bearing part 8, so that the bearing-mounting of rotor 10 is not affected thereby, and such lateral pressure does not introduce any additional friction for rotor 10. It will be noted that a space 28 remains between socket portion 26 and the body of bearing part 8, thus allowing the above-mentioned lateral resiliency of socket portion 26.

In the lower part of FIG. 1, rod 22 is seen to include a threaded portion 29 about which a part 30, comprising a threaded bore 31, is fitted. The end of part 30 opposite the one into which bore 31 opens has a transverse bore 32 intended to receive a rod which will be the part actuated by the linear actuator, this rod being any sort of bar or part of an apparatus supposed to undergo linear motion. At the same time, the fitting of a rod into transverse bore 32 keeps part 30 from rotating, so that when rod 22 rotates, part 30 is displaced longitudinally instead of rotating. If necessary, special means contiguous to the assembly of motor 1 and reducer 16, might be provided for preventing any rotary motion of part 30, which constitutes the driven part of the linear motion apparatus.

It will also be noted that bell-shaped part 17 includes, above the cylindrical portion 19 receiving ball-bearing 20, a wider recess in which a protective cap 33 is fitted. Cap 33 protects the threaded end of rod 22, on which means 34—typically nut-and-washer means—are mounted for fixing the end of rod 22 in the hub-portion of driven gear-wheel 21 of the reducer and, at the same time, for securing the rotating part of ball-bearing 20. Cap 33 is attached by means not shown, e.g., screws or hooks, to the bottom of the aforementioned wider recess in body 17 in such a way as to hold the fixed part of ball-bearing 20 in place.

Cast or molded body 17 also includes, above the part accommodating ball-bearing 20, two horns 35 in which there are two axially aligned bores 36 intended to receive a bar or rod to which the actuator will be attached.

In fact, the actuator operates to cause a linear movement between the axis of the bar situated in bores 36 of horns 35 and the axis of the bar situated in bore 32 of part 30.

The design of this actuator is particularly advantageous inasmuch as the housing of the speed-reducer is inexpensively formed by cast or molded part 17 which already has all the functional surfaces necessary. On the other hand, the long space between the two bearings (20, 26) which guide rod 22, and above all the resiliency given to socket part 26 forming the second bearing of rod 22, ensure excellent guidance of rod 22 as well as very good immunity of the latter to lateral pressure to which it will most probably be subjected at the level of driven linear-motion part 30.

The embodiment illustrated in FIG. 2 will now be considered. The general design of the actuator is the same as in FIG. 1, and in particular, all the portion forming the speed-reducer is identical, the same components being designated by the same reference numerals. On the other hand, in the embodiment of FIG. 2, stepping motor 37 is of another type. Its stator is of the same design, but its rotor and its driven rotary assembly, as well as the associated bearings, are of a different type. Motor 37 is of the type in which the rotor is not integral with the driven rotary assembly of the motor but drives it by the effect of a hysteresis coupling. Such a motor is described and shown, for example, in FIGS. 1 and 2 of U.S. Pat. No. 4,137,473 to the present applicant. In this motor, there is a magnetic part 38 which is the rotor and the driving part of the hysteresis coupling at the same time. Part 38 is a tubular magnetic part mounted in the two bearings 39 and 40, typically of plastic material, which take the place of bearings 8 and 9 in the preceding embodiment. Within tubular magnetic part 38 there is a second tubular part 41 of a magnetic or ferromagnetic material, which constitutes the driven part of the hysteresis coupling, and which is extended to form a hub guided in bearing 40, and bears at the end the pinion toothing 25 that drives the gear-trains of the speed-reducer as in the first embodiment described.

Intermediate bearing 40, typically of plastic material, seated in interposed annular plate 6, has two bearing guiding surfaces, an outer one for tubular part 38 forming the rotor of the motor and the driving part of the hysteresis coupling, and another inner one which guides the smooth portion of tubular part 41 between the place where it has the pinion toothing 25 and the place where it forms the driven part of the hysteresis coupling.

Furthermore, bearing part 39, mounted in end plate 5 of motor 37, acts as a triple bearing; for it has an outer cylindrical surface serving as a bearing for the combined rotor and coupling driving part, then an inner cylindrical portion serving as an end bearing for tubular part 41 constituting the driven part of the hysteresis coupling, i.e., the driven rotary assembly of the motor, and finally a socket-shaped part 42 which guides rod 22 in the same way as the socket-shaped part 26 in the preceding embodiment. Once again, there is left between bearing part 39 and socket part 42 a space 44 which allows a resilient lateral movement of socket 42 when the end of rod 22 is subjected to radial pressure. The portion 43 which joins socket part 42 to the body of bearing part 39 is likewise a thin portion possessing elasticity. Moreover, socket part 42 itself, as well as socket part 26 in the first embodiment described, may also be formed, at least in certain parts along its length, as a thin portion providing a certain resiliency.

For the rest, the embodiment of FIG. 2 is similar to that of FIG. 1. These two embodiments have the same advantages, already enumerated in connection with FIG. 1. The embodiment of FIG. 2 presents the additional advantages of providing the possibility of slipping in case of maximum torque, i.e., in the present instance, in case of too great resistance to the linear advance of part 30. In this event, the electric power causing rotor 38 to advance may continue to be supplied; but as soon as part 30 can no longer advance, rod 22 ceases to move, its blocking being transmitted by the reduction gear to driven part 41 of the hysteresis coupling, which then stops rotating. The great advantage of this arrangement is that it does not require a precision end contact to stop the linear movement at the moment when it has to be limited, e.g., by the existence of a stop member. This is valid for both operating directions. If it is desired to cause part 30 to effect a certain linear motion, it is possible, without providing any particular limit contact, simply to give the motor an electric drive for a sufficiently long time; part 30 will arrive at its destination, then the motor will keep running for a few seconds with slipping of the hysteresis coupling, long enough to ensure the required safety margin, then the motor will stop. For the return of part 30, the same procedure may be used; there is no need for a contact stop, but only a simple impact stop which halts the movement of the part controlled for linear motion.

What is claimed is:

1. In a linear actuator of the type comprising an electric motor having a stator, a rotor comprising a cylinder of magnetic material mounted for rotation adjacent said stator, and a rotary assembly coaxial with and driven by said rotor, a speed-reducer having a driving gear integral with said driven rotary assembly of said motor and a further gear that is driven by said driving gear, a rotary actuating stem which rotates with said driven gear of said speed-reducer and which includes a threaded portion situated outside of said motor and said speed-reducer, a driven linear-motion part including a thread meshing with said threaded portion of said stem and cooperating with said stem to move said linear-motion part linearly parallel to the longitudinal axis of said stem when said stem rotates, and means for preventing rotation of said linear-motion part, the improvement wherein said speed-reducer is disposed coaxially with and adjacent to said motor, said driving gear and said driven gear of said speed-reducer being coaxial with each other and with said driven rotary assembly and said rotor of said motor, said stem passing axially through said rotor and said rotary assembly of said motor, and said threaded portion of said stem being situated in proximity to the side of said motor remote from said speed-reducer, a first stem bearing disposed at the end of said speed-reducer remote from said motor, and a further bearing fixed at the end of said motor remote from said speed reducer, said further bearing having two portions which are attached to one another and which are radially movable relative to one another, one of said portions comprising a second stem bearing which is situated at said end of said motor whereby said stem is supported for rotation between said first and second stem bearings which are axially spaced from one another by a distance at least equal to the combined axial dimensions of said motor and said speed reducer, the other of said portions of said further bearing being a radially fixed bearing for at least one of said rotor and said driven rotary assembly, said second stem bearing taking the form of a socket portion of said further bearing which is capable of resiliently moving radially relative to the portion of said further bearing constituting said radially fixed bearing, said stem extending as a cantilever from said radially movable socket portion of said further bearing outwardly of said motor into thread engagement with said linear motion part.

2. The actuator of claim 1, further comprising an intermediate bearing situated at the location where said speed-reducer adjoins said motor, said driven gear of said speed-reducer being integral with said stem and said driven rotary assembly and said driving gear of said speed-reducer being integral with one another and forming a single body mounted in and guided by said intermediate bearing.

3. The actuator of claim 2, wherein said intermediate bearing is of synthetic material, further comprising a single circular part forming a driving pinion of said speed-reducer, a smooth cylindrical portion guided in said intermediate bearing, and a support to which said pole ring of said rotor is permanently secured.

4. The actuator of claim 1, further comprising an intermediate bearing situated at the location where, said speed-reducer adjoins said motor, said driven gear of said speed-reducer being integral with said stem, said driven rotary assembly of said motor being coupled to said rotor in a hysteresis coupling, and said driven rotary assembly of said motor and said driving gear of said speed-reducer being integral with one another and forming a single body mounted in and guided by said intermediate bearing.

5. The actuator of claim 4, wherein said intermediate bearing is of synthetic material, further comprising a single circular part forming a driving pinion of said speed-reducer, a smooth cylindrical portion guided in said intermediate bearing, and a ring of ferromagnetic material constituting the driven part of said hysteresis coupling.

6. The actuator of claim 1 wherein said further bearing comprises a unitary body fitted into a fixed plate at one end of said motor, said body having a cylindrical portion forming said radially fixed bearing, and said body having another portion forming said socket constituting said second stem bearing which is monolithically joined to said cylindrical portion of said body by at least one thin portion of said body that exhibits radial elasticity.

7. The actuator of claim 6, wherein said body is fabricated of synthetic material.

8. The actuator of claim 6 wherein said portion of said further bearing part forming said socket is joined to said radially fixed bearing portion of said body by a thin radial portion of said body which is situated at one end of said socket portion, an annular space remaining between said radially fixed bearing portion of said body and said socket portion, said space being sufficient to permit a radial resilient movement of said socket portion in response to radial forces exerted upon said stem.

9. The actuator of claim 1, wherein said motor is a stepping motor.

10. The actuator of claim 1, wherein said speed-reducer is disposed within a housing having an interposed plate which is both an end part of said motor on the speed-reducer housing side of said actuator and an end part of said housing on the motor side of said actuator, said housing including a body of general bell shape which is fixed at its periphery to the periphery of said interposed plate, said bell shape body having said first stem bearing centrally located therein, said interposed plate including means forming a bearing for said speed-reducer driving gear and for at least one of said driven rotary assembly and said rotor of said motor.

11. The actuator of claim 10, wherein said bell shape body has two horns respectively provided with bores perpendicular to the axis of said driving and driven gears of said speed-reducer, said bores having their respective axes in alignment with one another for receiving a bar to which the actuator is intended to be fastened.

12. The actuator of claim 1, wherein said driven linear-motion part is elongated and includes a threaded longitudinal bore therein which is open at one end and which fits on said threaded portion of said stem, said driven linear motion part further having, at the end thereof remote from the open end of said threaded longitudinal bore, a transverse bore for receiving a bar intended to be moved linearly by the actuator in the axial direction of said stem.

* * * * *